(12) United States Patent
Shahana et al.

(10) Patent No.: US 10,927,952 B2
(45) Date of Patent: Feb. 23, 2021

(54) SHIFTING CONTROLLER AND SHIFTING SYSTEM

(71) Applicant: Shimano Inc., Osaka (JP)

(72) Inventors: Satoshi Shahana, Osaka (JP); Takehiko Nakajima, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/292,746

(22) Filed: Mar. 5, 2019

(65) Prior Publication Data

US 2019/0309841 A1 Oct. 10, 2019

(30) Foreign Application Priority Data

Apr. 6, 2018 (JP) .............................. JP2018-074232

(51) Int. Cl.
| | |
|---|---|
| *F16H 59/44* | (2006.01) |
| *F16H 61/02* | (2006.01) |
| *B62M 25/08* | (2006.01) |
| *F16H 59/14* | (2006.01) |
| *F16H 59/66* | (2006.01) |
| *F16H 59/48* | (2006.01) |
| *F16H 59/64* | (2006.01) |

(52) U.S. Cl.
CPC .......... *F16H 61/0213* (2013.01); *B62M 25/08* (2013.01); *F16H 59/44* (2013.01); *F16H 59/48* (2013.01); *F16H 59/64* (2013.01); *F16H 59/66* (2013.01); *F16H 2059/147* (2013.01); *F16H 2059/663* (2013.01)

(58) Field of Classification Search
CPC .... F16H 59/44; F16H 2059/663; F16H 59/48; F16H 59/66; F16H 2059/147; F16H 2061/0227; B62M 25/08; B62M 9/133; B62M 9/132; B62M 9/123; B62M 9/122; B62M 2025/003
USPC ......................................... 701/52, 61, 64, 65
See application file for complete search history.

(56) References Cited

U.S. PATENT DOCUMENTS

| | | | |
|---|---|---|---|
| 9,656,672 B2* | 5/2017 | Schieffelin | B62M 9/04 |
| 2005/0075774 A1* | 4/2005 | Takamoto | B62K 23/04 |
| | | | 701/51 |
| 2016/0280330 A1* | 9/2016 | Hara | B62K 25/286 |
| 2016/0375957 A1* | 12/2016 | Hashimoto | B62M 9/123 |
| | | | 474/70 |
| 2018/0111661 A1* | 4/2018 | Wesling | F16H 61/0213 |

(Continued)

FOREIGN PATENT DOCUMENTS

| | | | |
|---|---|---|---|
| EP | 2511166 A1 * | 10/2012 | B62M 9/123 |
| JP | 2005-96537 A | 4/2005 | |

*Primary Examiner* — Roger L Pang
(74) *Attorney, Agent, or Firm* — Global IP Counselors, LLP

(57) ABSTRACT

A shifting controller controls a shifting device of a human-powered vehicle and includes a data acquisition interface, a data storage device, and a control unit. The data acquisition interface is configured to acquire a first reference value of a first variable in relation to the human-powered vehicle. The data storage device has stored therein a shifting condition specified by at least one of a direction of change, an amount of change, and a rate of change that are information on a change in the first variable. The control unit includes a processor that is configured to control the shifting device based on a change in the first reference value and the shifting condition.

15 Claims, 8 Drawing Sheets

(56) References Cited

U.S. PATENT DOCUMENTS

2019/0195341 A1\* 6/2019 Baumgaertner ........ F16H 59/14
2019/0308690 A1\* 10/2019 Terashima ............. B62M 25/08

\* cited by examiner

| NUMBER | FRONT SPROCKETS | REAR SPROCKETS | | INCLINATION | SPEED | TORQUE | POWER | CADENCE |
|---|---|---|---|---|---|---|---|---|
| 1 | 1 | 1 | UPPER LIMIT VALUE | ⋮ | ⋮ | ⋮ | ⋮ | ⋮ |
| | | | LOWER LIMIT VALUE | ⋮ | ⋮ | ⋮ | ⋮ | ⋮ |
| 2 | 1 | 2 | UPPER LIMIT VALUE | ⋮ | ⋮ | ⋮ | ⋮ | ⋮ |
| | | | LOWER LIMIT VALUE | ⋮ | ⋮ | ⋮ | ⋮ | ⋮ |

| NUMBER | FRONT SPROCKETS | REAR SPROCKETS | | AMOUNT OF CHANGE IN INCLINATION | AMOUNT OF CHANGE IN SPEED | AMOUNT OF CHANGE IN TORQUE | AMOUNT OF CHANGE IN POWER | AMOUNT OF CHANGE IN CADENCE |
|---|---|---|---|---|---|---|---|---|
| 1 | 1 | 1 | UPPER LIMIT VALUE | ... | ... | ... | ... | ... |
|   |   |   | LOWER LIMIT VALUE | ... | ... | ... | ... | ... |
| 2 | 1 | 2 | UPPER LIMIT VALUE | ... | ... | ... | ... | ... |
|   |   |   | LOWER LIMIT VALUE | ... | ... | ... | ... | ... |
| ...... |

FIG. 4

|  |  | AMOUNT OF CHANGE IN INCLI-NATION | AMOUNT OF CHANGE IN SPEED | AMOUNT OF CHANGE IN TORQUE | AMOUNT OF CHANGE IN POWER | AMOUNT OF CHANGE IN CADENCE |
|---|---|---|---|---|---|---|
| AUTOMATIC-SHIFTING DETERMINA-TION REFER-ENCE VALUE | UPPER LIMIT VALUE | ... | ... | ... | ... | ... |
|  | LOWER LIMIT VALUE | ... | ... | ... | ... | ... |

SHIFTING CONTROLLER AND SHIFTING SYSTEM

CROSS-REFERENCE TO RELATED APPLICATIONS

This application claims priority to Japanese Patent Application No. 2018-074232, filed on Apr. 6, 2018. The entire disclosure of Japanese Patent Application No. 2018-074232 is hereby incorporated herein by reference.

BACKGROUND

Technical Field

The present invention generally relates to a shifting controller and a shifting system.

Background Information

Human-powered vehicles can run under conditions suitable for traveling states by changing deceleration rates of power shifting device mechanisms in a multistage manner. In recent years, human-powered vehicles have been proposed that include functions automatically changing shift stages. In Japanese Patent Application Laid-Open No. 2005-96537, a shifting is controlled based on a result of detecting a traveling state.

SUMMARY

When the shift stage is automatically changed, it is required to set the shift stage that allows a rider to perform easier riding.

The present invention has been made to solve the problem described above and has an object to provide a shifting controller and a shifting system that are capable of changing, at appropriate timing, the shift stage to one that allows the rider to perform easier riding.

To solve the problem described above and achieve the object, in accordance with a first aspect of the present invention, a shifting controller controls a shifting device of a human-powered vehicle and includes a data acquisition interface, a data storage device, and a control unit. The data acquisition interface is configured to acquire a first reference value of a first variable in relation to the human-powered vehicle. The data storage device has stored therein a shifting condition specified by at least one of a direction of change, an amount of change, and a rate of change that are information on a change in the first variable. The control unit includes a processor that is configured to control the shifting device based on a change in the first reference value and the shifting condition.

The shifting controller according to the first aspect controls the shift stage based on the information on the change, thereby making it possible to change the shift stage in accordance with a change in rider's traveling situation. The shifting controller, thus, can change, at appropriate timing, the shift stage to one that allows the rider to perform easier riding.

To solve the problem described above and achieve the object, in accordance with a second aspect of the present invention, a shifting controller controls a shifting device of a human-powered vehicle and includes a data acquisition interface, a data storage device, and a control unit. The data acquisition interface is configured to acquire a first reference value of a first variable in relation to the human-powered vehicle and a second reference value of a second variable in relation to the human-powered vehicle. The data storage device has stored therein a shifting condition specified by the first variable and a switching condition specified by the second variable. The control unit is configured to maintain a current shift stage in a first state where the second reference value acquired by the data acquisition interface does not satisfy the switching condition. The control unit includes a processor that is configured to control the shifting device based on the first reference value and the shifting condition in a second state where the second reference value acquired by the data acquisition interface satisfies the switching condition.

The shifting controller according to the second aspect controls the shift stage based on the shifting condition in a state where the switching condition is satisfied, thereby making it possible to change the shift stage in accordance with a change in rider's traveling situation. The shifting controller, thus, can change, at appropriate timing, the shift stage to one that allows the rider to perform easier riding.

In accordance with a third aspect, in the shifting controller according to the second aspect, the data acquisition interface is configured to acquire a plurality of the first reference values of a plurality of different ones of the first variables, and the processor is configured to control the shifting device based on the first reference values and the shifting condition.

The shifting controller according to the third aspect controls the shifting device based on the several different conditions, thereby making it possible to change, at appropriate timing, the shift stage to one that allows the rider to perform easier riding.

In accordance with a fourth aspect, in the shifting controller according to the second or third aspect, the data acquisition interface is configured to acquire a plurality of the second reference values of a plurality of different ones of the second variables, and the processor is configured to maintain the current shift stage in a state where at least one of the second reference values does not satisfy the switching condition.

The shifting controller according to the fourth aspect can change, at appropriate timing, the shift stage to one that allows the rider to perform easier riding.

In accordance with a fifth aspect, in the shifting controller according to any one of the second to fourth aspects, the switching condition is information on a change in the second variable.

The shifting controller according to the fifth aspect can change, at appropriate timing, the shift stage to one that allows the rider to perform easier riding.

In accordance with a sixth aspect, in the shifting controller according to any one of the second to fifth aspects, the switching condition is specified to differ for each shift stage of the shifting device.

The shifting controller according to the sixth aspect can change, at appropriate timing, the shift stage to one that allows the rider to perform easier riding.

In accordance with a seventh aspect, in the shifting controller according to any one of the second to sixth aspects, the first variable and the second variable differ from each other.

The shifting controller according to the seventh aspect can change, at appropriate timing, the shift stage to one that allows the rider to perform easier riding.

In accordance with an eighth aspect, in the shifting controller according to any one of the second to sixth aspects, the first variable and the second variable are identical.

The shifting controller according to the eighth aspect can change, at appropriate timing, the shift stage to one that allows the rider to perform easier riding.

In accordance with a ninth aspect, in the shifting controller according to the first aspect, the data acquisition interface is configured to acquire a plurality of the first reference values of a plurality of different ones of the first variables, and the processor is configured to control the shifting device based on the first reference values and the shifting condition.

The shifting controller according to the ninth aspect can change, at appropriate timing, the shift stage to one that allows the rider to perform easier riding.

In accordance with a tenth aspect, in the shifting controller according to any one of the first to ninth aspects, the first variable includes at least one of traveling information on a traveling state of the human-powered vehicle and environmental information on a traveling environment of the human-powered vehicle.

The shifting controller according to the tenth aspect can change, at appropriate timing, the shift stage to one that allows the rider to perform easier riding.

In accordance with an eleventh aspect, in the shifting controller according to any one of the second to eighth aspects, the second variable includes at least one of traveling information on a traveling state of the human-powered vehicle and environmental information on a traveling environment of the human-powered vehicle.

The shifting controller according to the eleventh aspect can change, at appropriate timing, the shift stage to one that allows the rider to perform easier riding.

In accordance with a twelfth aspect, in the shifting controller according to the tenth or eleventh aspect, the traveling information includes at least one of a cadence, torque acting on a crank of the human-powered vehicle, a speed of the human-powered vehicle, an acceleration, and power.

The shifting controller according to the twelfth aspect can change, at appropriate timing, the shift stage to one that allows the rider to perform easier riding.

In accordance with a thirteenth aspect, in the shifting controller according to any one of the tenth to twelfth aspects, the environmental information includes at least one of road surface information on a road surface state. The road surface information includes an inclination, traveling resistance information on a traveling resistance, weather information on weather, and atmospheric temperature information on an atmospheric temperature.

The shifting controller according to thirteenth aspect can change, at appropriate timing, the shift stage to one that allows the rider to perform easier riding.

To solve the problem described above and achieve the object, in accordance with a fourteenth aspect, a shifting system includes a shifting device; the shifting controller according to any one of the first to twelfth aspects; and a user input operatively connected to the shifting device. Shifting is performed on the shifting device based on the shifting operation.

The shifting control system according to the fourteenth aspect can change, at appropriate timing, the shift stage to one that allows the rider to perform easier riding.

To solve the problem described above and achieve the object, in accordance with a fifteenth aspect, a shifting system includes a shifting device of a human-powered vehicle; a user input operatively connected to the shifting device; a data acquisition interface; a data storage device; and a control unit. The data acquisition interface is configured to acquire a first reference value of a first variable in relation to the human-powered vehicle and a second reference value of a second variable in relation to the human-powered vehicle. The data storage device has stored therein a shifting condition specified by the first variable and a switching condition specified by the second variable. The control unit is configured to control the shifting device based on only the shifting operation in a first state where the second reference value acquired by the data acquisition interface does not satisfy the switching condition. The control unit is configured to control the shifting device based on the first reference value and the switching condition in a second state where the second reference value acquired by the data acquisition interface satisfies the switching condition.

The shifting control system according to the fifteenth aspect can change, at appropriate timing, the shift stage to one that allows the rider to perform easier riding.

In accordance with a sixteenth aspect, in the shifting system according to the fifteenth aspect, the processor is configured to control the shifting device based on the shifting operation even in the second state.

The shifting control system according to the sixteenth aspect can change, at appropriate timing, the shift stage to one that allows the rider to perform easier riding.

In accordance with a seventeenth aspect, the shifting system according to any one of the fourteenth to sixteenth aspects further includes a notification device configured to notify a user of a current state being in at least either the first state or the second state.

The shifting control system according to the seventeenth aspect allows the rider to know the current state.

According to the present invention, it is possible to change, at appropriate timing, the shift stage to one that allows the rider to perform easier riding.

BRIEF DESCRIPTION OF DRAWINGS

Referring now to the attached drawings which form a part of this original disclosure.

FIG. 3 is a diagram partially illustrating an example of a first shifting condition table.

FIG. 4 is a diagram partially illustrating an example of a second shifting condition table.

DESCRIPTION OF EMBODIMENTS

A preferred embodiment of the invention will be described in detail below with reference to the accompanying drawings. It should be noted that the present invention is not limited by the embodiment. In a case that there are multiple embodiments, the present invention encompasses a configuration including a combination of embodiments.

Overall Structure of Human-Powered Vehicle

Figure 1:
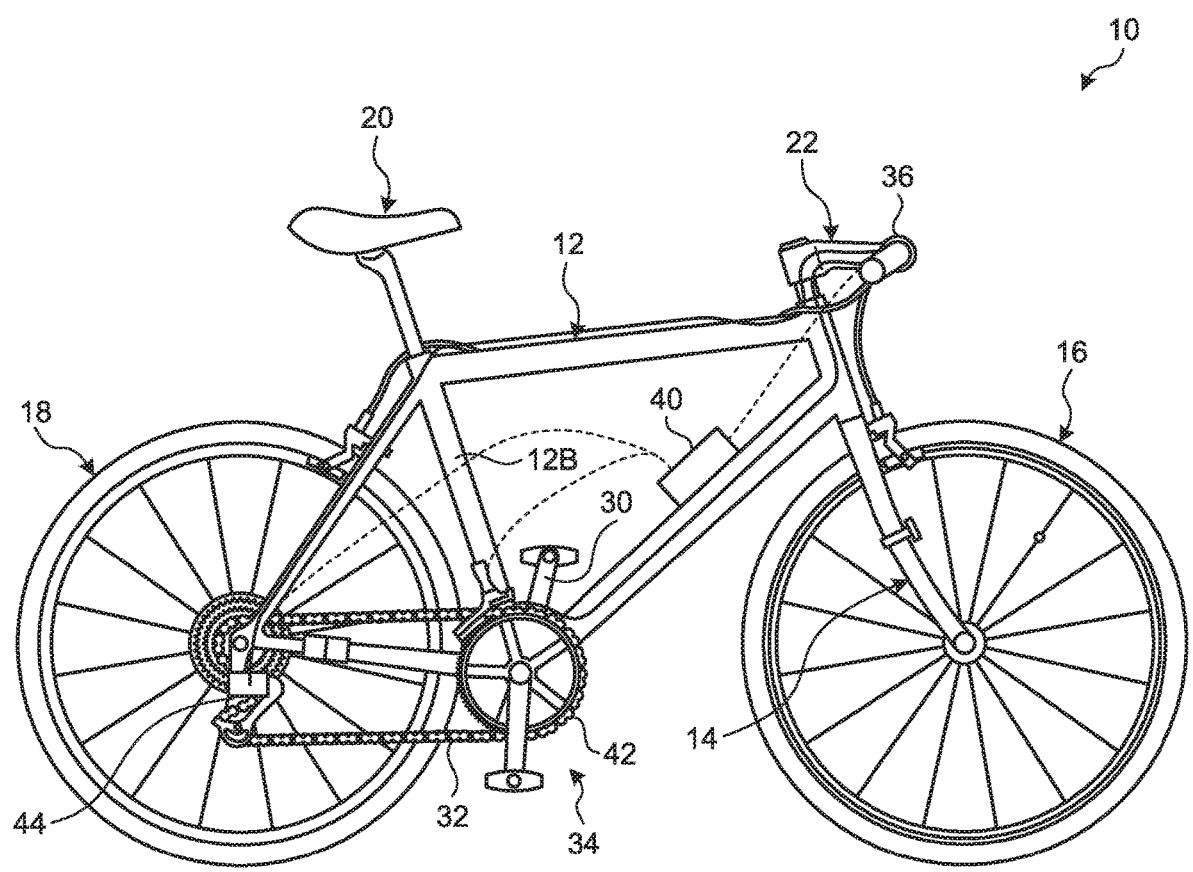
FIG. 1 is a schematic diagram illustrating a schematic structure of a human-powered vehicle (e.g., a bicycle) according to an embodiment.

FIG. 1 is a schematic diagram illustrating a schematic structure of a human-powered vehicle according to the embodiment. As illustrated in FIG. 1, a human-powered vehicle 10 according to the embodiment is a vehicle driven by a person who rides on the human-powered vehicle 10, i.e., the rider of the human-powered vehicle 10. The human-powered vehicle 10 in the embodiment refers to a vehicle that partially uses human power as driving power for traveling and includes a vehicle that assists human power by electric power. The human-powered vehicle does not include a vehicle that uses only driving power other than human power. Particularly, the human-powered vehicle does not include a vehicle that uses only an internal combustion as the driving power. In general, the human-powered vehicle is considered as a small and light-weight vehicle and a vehicle that does not require a license on a public road.

In the embodiment, the human-powered vehicle 10 includes a shifting system 11. The human-powered vehicle 10 is a bicycle driven by human driving power of the rider. The human-powered vehicle 10 includes a frame 12, a fork 14, a front wheel 16, a rear wheel 18, a saddle 20, a handlebar 22, a crank 30, a chain 32, a shifting device 34, a user input 36, and a shifting controller 40. The shifting system 11 includes the shifting device 34, the shifting controller 40, and the user input 36 to which a shifting operation of the shifting device is input. The shifting system 11 performs shifting on the shifting device 34 based on the shifting operation.

In the human-powered vehicle 10, the crank 30 and the rear wheel 18 are coupled to each other via the chain 32 and the shifting device 34. As a result, rotation of the crank 30 is transferred to the rear wheel 18. The shifting device 34 includes a plurality of front sprockets 42 that rotate integrally with the crank 30 in a forward direction, and a plurality of rear sprockets 44 that rotate integrally with the rear wheel 18 in the forward direction. The forward direction is the direction in which the human-powered vehicle 10 moves forward. The front sprockets 42 and the rear sprockets 44 each include a plurality of gears having the different numbers of teeth. The chain 32 is wound around one of the front sprockets 42 and one of the rear sprockets 44. A gear ratio is changed in accordance with the gears of the front sprockets 42 and the rear sprockets 44 around which the chain 32 is wound.

The user input 36 is a device that accepts input of an operation for a shift stage of the shifting device 34. The user input 36 can also be called a user operable input device or an operation unit. Examples of the user input 36 includes a rotatable grip, a button, a switch, a lever, a dial and/or a touch screen. The user input 36 detects an operation to switch a shifting mode and an operation to change the shift stage. Various methods are exemplified as a method for transmitting the accepted operation to change the shift stage to the shifting device 34 performed by the user input 36. The user input 36 can transfer the operation to the shifting device 34 using an electrical signal, hydraulic pressure, or a wire. The user input 36 and the shifting device 34 can be coupled to each other in a wired or wireless manner.

Structure of Shifting Controller

Figure 2:
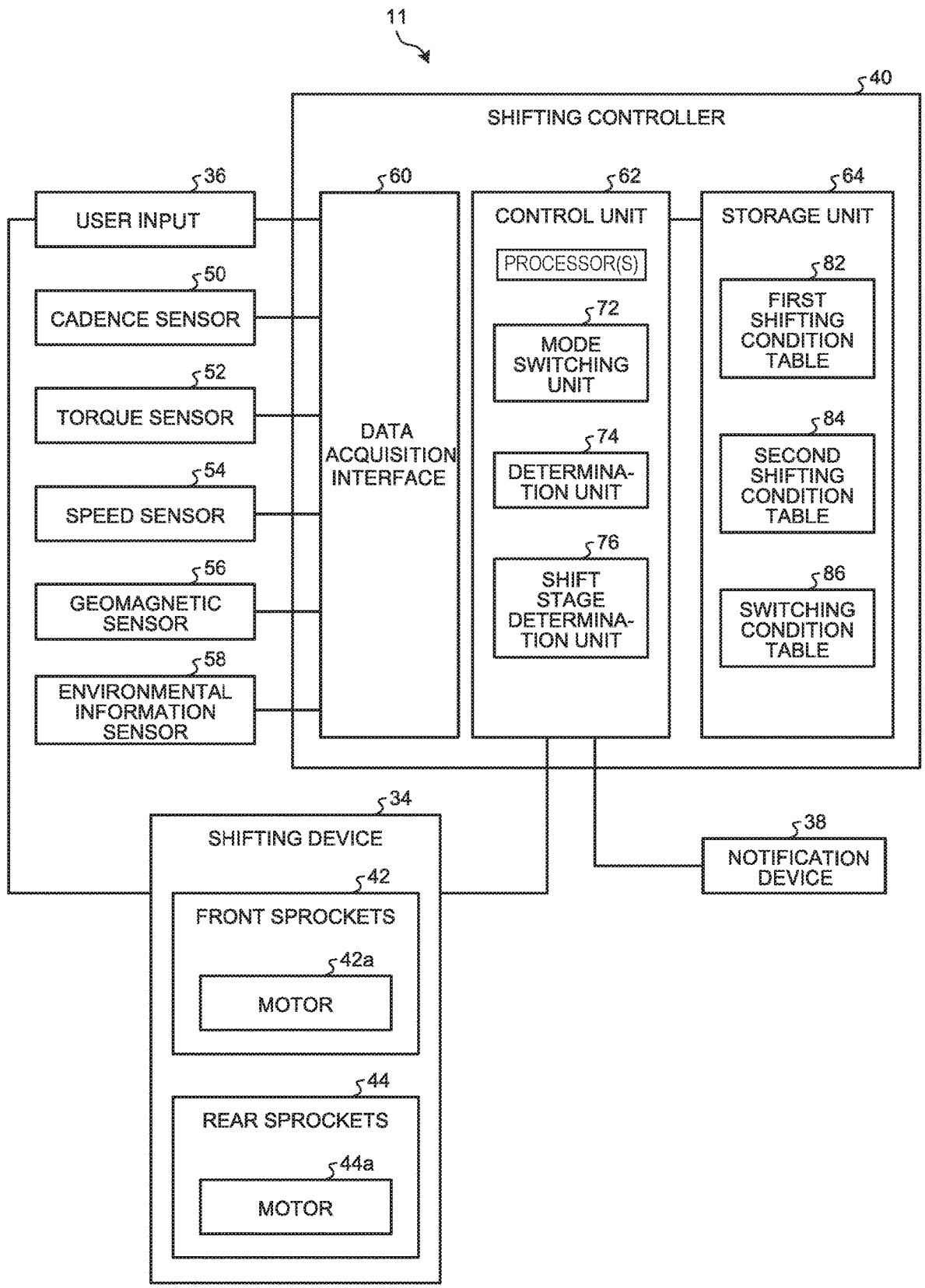
FIG. 2 is a block diagram of a shifting controller.

FIG. 2 is a block diagram of the shifting controller. The shifting controller 40 controls the shift stage of the shifting device 34. The shifting controller 40 includes a data acquisition interface 60, a control unit 62, and a data storage device 64. In the shifting controller 40, the data acquisition interface 60 acquires various types of information, and the control unit 62 controls operation of the shifting device 34 based on the acquired information and information stored in the data storage device 64.

The data acquisition interface 60 is coupled to the user input 36, a cadence sensor 50, a torque sensor 52, a speed sensor 54, a geomagnetic sensor 56, and an environmental information sensor 58. The data acquisition interface 60 acquires information from the user input 36 and the respective sensors. The data acquisition interface 60 sends the acquired information to the control unit 62. The data acquisition interface 60 is a data acquisition interface which is hardware that connects the interconnects the user input 36 and the sensors 52, 54, 56 and 58 to the control unit 62. For example, the data acquisition interface 60 (the data acquisition interface) includes one or more of analog input/output, digital input/output, or counter and timer. The data acquisition interface 60 communicates with the user input 36 and the sensors 52, 54, 56 and 58 in a wired or wireless manner. Likewise, the data acquisition interface 60 communicates with the control unit 62 in a wired or wireless manner.

The cadence sensor 50 detects a rotational speed of the crank of the human-powered vehicle 10. The cadence sensor 50 is provided to the frame 12 of the human-powered vehicle 10, for example. The cadence sensor 50 includes a magnetic sensor that detects a magnet provided to a crank arm of the crank 30 of the human-powered vehicle 10. The cadence sensor 50 detects the rotational speed of the crank arm from the detection result of the magnetic sensor.

The torque sensor 52 detects torque applied to the crank. The torque sensor 52 is provided to the frame 12 of the human-powered vehicle 10, for example. The torque sensor 52 is a strain sensor, a magnetostrictive sensor, or an optical sensor that detects torque applied to the crank, for example.

The speed sensor 54 detects a traveling speed of the human-powered vehicle 10. The speed sensor 54 is provided to at least one of the frame and a front fork of the human-powered vehicle 10, for example. The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. The speed sensor 54 includes a magnetic sensor that detects a magnet provided to a spoke of the front wheel of the human-powered vehicle 10. The speed sensor 54 detects the rotational speed of the front wheel from a detection result of the magnetic sensor. The speed sensor 54 detects the traveling speed of the human-powered vehicle 10 from the rotational speed of the front wheel.

The geomagnetic sensor 56 is provided to the frame 12 of the human-powered vehicle 10, for example. The geomagnetic sensor 56 detects a direction of the frame 12 with respect to the gravity force direction, thereby detecting a posture of the human-powered vehicle 10.

The environmental information sensor 58 acquires environmental information. The environmental information includes at least one of road surface information on a road surface state including an inclination, traveling resistance information on a traveling resistance, weather information on weather, and atmospheric temperature information on an atmospheric temperature. The environmental information sensor 58 is provided to the frame 12 of the human-powered vehicle 10, for example. Examples of the environmental information sensor 58 include a communication device that acquires the environmental information via internet communication, a temperature sensor that detects an ambient temperature, a humidity sensor that detects an ambient humidity, and a sensor that detects conditions of a traveling road surface from an image.

The control unit 62 performs calculation based on the result acquired by the data acquisition interface 60 and the condition stored in the data storage device 64 and controls the operation of the shifting device 34 based on the calculation result. The control unit 62 is a central processing unit (CPU) or a micro processing unit (MPU), for example. The control unit 62 is preferably a microcomputer that includes one or more processors. The term "processor" as used herein refers to hardware that executes a software program, and does not include a human. The control unit 62 converts a signal received from an outside into a carrying signal. Thus, the control unit 62 is configured to perform a predefined set of basic operations in response to receiving a corresponding basic instruction selected from a predefined native instruction set of codes based on the signals that are received. The control unit 62 includes a mode switching unit 72, a determination unit 74, and a shift stage determination unit 76. The mode switching unit 72, the determination unit 74, and the shift stage determination unit 76 can be hardware and/or software that carries out the prescribed functions.

The mode switching unit 72 switches between a manual shifting mode and an automatic shifting mode. The mode switching unit 72 comprises a set of machine codes selected from the native instruction set of the control unit 62 for switching between the manual shifting mode and the automatic shifting mode. In the manual shifting mode, the shift stage is controlled based on at least one of the rider's operation and the information acquired by the data acquisition interface 60. In the automatic shifting mode, the shift stage is automatically controlled based on a traveling condition, for example. The mode switching unit 72 sends information on the detected mode to the determination unit 74 to switch whether processing in the determination unit 74 is to be performed.

The determination unit 74 determines whether the shift stage determination unit 76 is to control the shift stage based on the information acquired by the data acquisition interface 60 and a table stored in the data storage device 64. The determination unit 74 comprises a set of machine codes selected from the native instruction set of the control unit 62 for controlling the shift stage based on the information acquired by the data acquisition interface 60 and the table stored in the data storage device 64.

The shift stage determination unit 76 determines the shift stage of the shifting device 34 based on the traveling condition and controls motors 42a and 44a of the shifting device 34 such that the determined shift stage is set. The shift stage determination unit 76 comprises a set of machine codes selected from the native instruction set of the control unit 62 for determining the shift stage of the shifting device 34 based on the traveling condition and controls motors 42a and 44a of the shifting device 34. The shift stage determination unit 76 performs the processing in a state where the determination unit 74 determines to control the control speed stage.

The data storage device 64 includes a cache memory that temporarily stores therein information sent from the control unit 62, and a main memory that preliminarily stores therein information and continuously stores therein information sent from the control unit 62. The data storage device 64 is any computer storage device or any computer readable medium with the sole exception of a transitory, propagating signal.

Figures 5, 6:
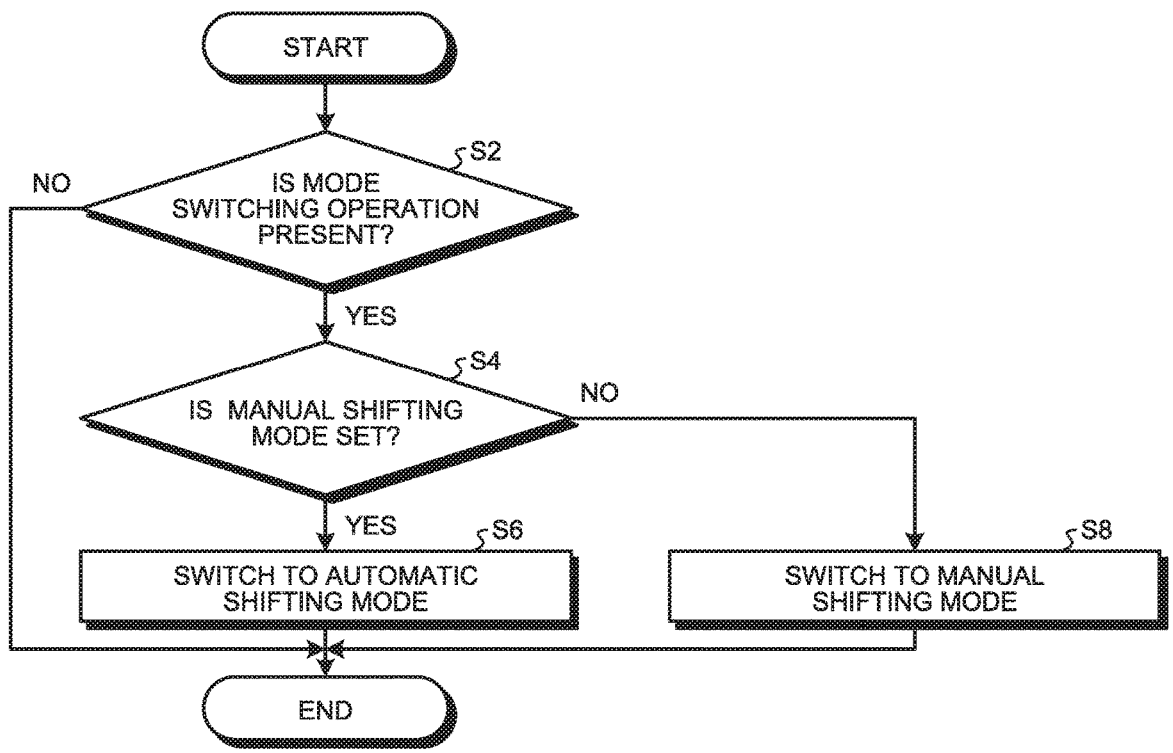
FIG. 5 is a diagram illustrating an example of a switching condition table.
FIG. 6 is a flowchart illustrating an exemplary flow of control by the shifting controller.

For example, the data storage device 64 is a random access memory (RAM) or a read only memory (ROM), for example. The data storage device 64 has a first shifting condition table 82, a second shifting condition table 84, and a switching condition table 86. FIG. 3 is a diagram partially illustrating an example of the first shifting condition table. FIG. 4 is a diagram partially illustrating an example of the second shifting condition table. FIG. 5 is a diagram illustrating an example of the switching condition table.

As illustrated in FIG. 3, in the first shifting condition table 82, relations between upper limit values and lower limit values of a plurality of parameters are set for each shift stage. The shift stages in the embodiment are combinations of gear stages of the front sprockets 42 and the gear stages of the rear sprockets 44. Examples of the multiple parameters include an inclination, a speed, torque, power, and a cadence. The first shifting condition table 82 in FIG. 3 illustrates a part of the shift stages. The upper limit values and the lower limit values of the parameters (variables) are, however, set for all of the shift stages.

In the second shifting condition table 84, relations between upper limit values and lower limit values of pieces of information on changes in a plurality of parameters are set for each shift stage. Specifically, as illustrated in FIG. 4, in the second shifting condition table 84, relations between the upper limit values and the lower limit values of amounts of changes in the multiple parameters are set for each shift stage. The shift stages in the embodiment are combinations of gear stages of the front sprockets 42 and the gear stages of the rear sprockets 44. Examples of the amounts of changes in the parameters (variables) include an amount of change in inclination, an amount of change in speed, an amount of change in torque, an amount of change in power, and an amount of change in cadence. The second shifting condition table 84 in FIG. 4 illustrates a part of the shift stages. The upper limit values and the lower limit values of amounts of changes in the parameters are, however, set for all of the shift stages. In the second shifting condition table 84, relations between the upper limit values and the lower limit values of rates of changes in the parameters can be set.

In the switching condition table 86, as illustrated in FIG. 5, relations between the upper limit values and the lower limit values of amounts of changes in a plurality of parameters are set. The switching condition is a range used as a reference for determining whether the shift stage is to be automatically changed. For example, it is determined whether the shift stage is to be automatically changed based on whether each parameter is out of a certain range specified by the upper limit value and the lower limit value.

Flow of Control by Shifting Controller

Figure 7:
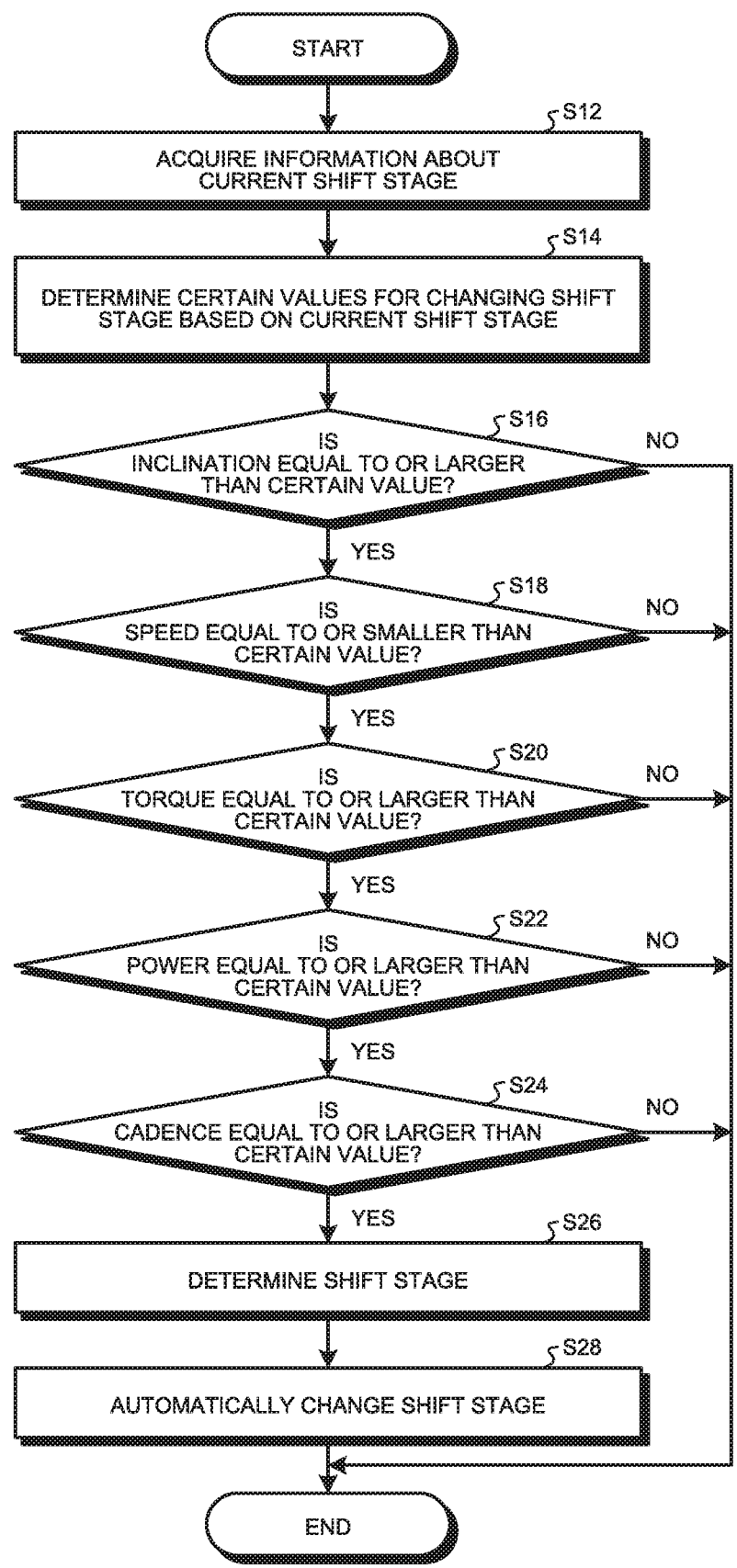
FIG. 7 is a flowchart illustrating the exemplary flow of the control by the shifting controller.

The following describes a flow of control performed by the shifting controller with reference to flowcharts. FIGS. 6 and 7 are flowcharts illustrating exemplary flows of control performed by the shifting controller.

The shifting controller 40 performs processing by the mode switching unit 72 to switch between the automatic shifting mode and the manual shifting mode. The details are described with reference to FIG. 6. The shifting controller 40 determines whether a mode switching operation is present (step S2). Specifically, the shifting controller 40 determines whether the mode switching operation is input to the user input 36. If it is determined that the mode switching operation is absent (No at step S2), then the shifting controller 40 ends the processing.

If it is determined that the mode switching operation is present (Yes at step S2), then the shifting controller 40 determines whether the manual shifting mode is set (step S4). If it is determined that the manual shifting mode is set (Yes at step S4), then the shifting controller 40 switches the mode from the manual shifting mode to the automatic shifting mode (step S6), and thereafter ends the processing. If it is determined that the manual shifting mode is not set, i.e., the automatic shifting mode is set (No at step S4), then the shifting controller 40 switches the mode from the automatic shifting mode to the manual shifting mode (step S8), and thereafter ends the processing.

In the embodiment, the mode is switched based on the rider's operation. The shifting controller 40 can determine whether the mode needs to be switched based on information on various parameters acquired by the data acquisition interface 60.

The shifting controller 40 performs the processing illustrated in FIG. 7 using the first shifting condition table 82 illustrated in FIG. 3 to control the shift stage. The shifting controller 40 preferably performs the processing in a state where the mode is the automatic shifting mode that automatically changes the shift stage.

The shifting controller 40 acquires information on the current shift stage (step S12). The control unit 62 acquires the information on the current shift stage based on the information acquired from the user input 36 via the data acquisition interface 60 and the information determined by the shift stage determination unit 76.

The shifting controller 40 determines certain values used for changing the shift stage based on the current shift stage (step S14). The shifting controller 40 sets the certain values based on the first shifting condition table 82 illustrated in FIG. 3 and the information on the current shift stage acquired. In the embodiment, the upper limit value of the inclination, the lower limit value of the speed, the upper limit value of the torque, the upper limit value of the power, and the upper limit value of the cadence that are set for the current shift stage are set as the certain values.

After determining the respective certain values, the shifting controller 40 determines whether the inclination is equal to or larger than the certain value (step S16). The control unit 62 detects the inclination based on the detection result of the geomagnetic sensor 56. If it is determined that the inclination is not equal to or larger than the certain value, i.e., the inclination is smaller than the certain value (No at step S16), the shifting controller 40 ends the processing.

If it is determined that the inclination is equal to or larger than the certain value (Yes at step S16), then the shifting controller 40 determines whether the speed is equal to or smaller than the certain value (step S18). The control unit 62 detects the speed based on the detection result of the speed sensor 54. If it is determined that the speed is not equal to or smaller than the certain value, i.e., the speed is larger than the certain value (No at step S18), then the shifting controller 40 ends the processing.

If it is determined that the speed is equal to or smaller than the certain value (Yes at step S18), then the shifting controller 40 determines whether the torque is equal to or larger than the certain value (step S20). The control unit 62 detects the torque based on the detection result of the torque sensor 52. If it is determined that the torque is not equal to or larger than the certain value, i.e., the torque is smaller than the certain value (No at step S20), then the shifting controller 40 ends the processing.

If it is determined that the torque is equal to or larger than the certain value (Yes at step S20), then the shifting controller 40 determines whether the power is equal to or larger than the certain value (step S22). The control unit 62 detects the power based on the detection results of the torque, the inclination, and the cadence, for example. If it is determined that the power is not equal to or larger than the certain value, i.e., the power is smaller than the certain value (No at step S22), then the shifting controller 40 ends the processing.

If it is determined that the power is equal to or larger than the certain value (Yes at step S22), then the shifting controller 40 determines whether the cadence is equal to or larger than the certain value (step S24). The control unit 62 detects the cadence based on the detection result of the cadence sensor 50. If it is determined that cadence is not equal to or larger than the certain value, i.e., the cadence is smaller than the certain value (No at step S24), then the shifting controller 40 ends the processing.

If it is determined that cadence is equal to or larger than the certain value (Yes at step S24), then the shifting controller 40 determines the shift stage (step S26). That is, the shifting controller 40 determines the shift stage in a state where it is determined that all of the parameters are out of the respective certain values, specifically, in a state where it is determined that each parameter is larger than the upper limit value or smaller than the lower limit value. The shift stage determination unit 76 of the shifting controller 40 performs processing so as to set a shift stage to which the current shift stage is to be changed. The shift stage determination unit 76 sets the shift stage based on the upper limit values and the lower limit values of the respective parameters in the second shifting condition table 84 and the parameters under the current traveling condition. Specifically, the shift stage determination unit 76 determines the shift stage for which each parameter under the current running traveling condition is within a range between the upper limit value and the lower limit value of the parameter. That is, the shifting controller 40 sets the shift stage based on the information on changes in the multiple parameters.

The shifting controller 40 controls the shifting device 34 based on the determined shift stage, automatically change the shift stage (step S28), and ends the processing.

As described above, the shifting controller 40 can switch between the automatic shifting mode and the manual shifting mode. In the automatic shifting mode, the shifting controller 40 controls the shift stage based on the information on changes in the multiple parameters (variables), thereby making it possible to change, at more appropriate timing, the shift stage adapted to the traveling condition.

The shifting controller 40 according to the embodiment changes the shift stage in a state where each of the parameters of the inclination, speed, torque, power, and cadence is out of the range of the corresponding certain value. The invention is, however, not limited thereto. The shifting controller 40 preferably uses at least the torque as the variable. The shift stage can be preferably controlled by controlling the shifting device 34 based on the torque. The shifting controller 40 more preferably uses, as three variables, the torque, the inclination, and the speed. The shifting controller 40 more preferably further uses the power and the cadence as the variables.

The processing illustrated in FIG. 7 is preferably applied to a case of traveling on an uphill road. In a case of traveling on a downhill road, the upper limit values and the lower limit values set as the certain values can be interchanged and determination can be made based on based on whether each parameter is equal to or larger than the upper limit value or equal to or smaller than the lower limit value. Specifically, the lower limit value of the inclination, the upper limit value of the speed, the lower limit value of the torque, the lower limit value of the power, and the lower limit value of the cadence that are set for the current shift stage are set as the respective certain values. Then, the respective inequality signs in the processing illustrated in FIG. 7 are reversed. Alternatively, instead of a certain value, a certain range between the upper limit value and the lower limit value can be set for each parameter set for the current shift stage, and determination can be made based on whether each parameter is included in the corresponding certain range. In this case, in a state where all of the parameters are out of the respective certain ranges, the shift stage is changed. In other examples, the certain values can also be set as various references and ranges in the same manner as described above.

The shifting controller 40 can detect a traveling condition, such as an uphill road, a flat road, or a downhill road, and determine the certain values to be set and inequality signs for determining "Yes" or "No" on respective parameters based on the detected traveling condition. This determination way is also applied to other controls.

Flow of Other Control by Shifting Controller

Figure 8:
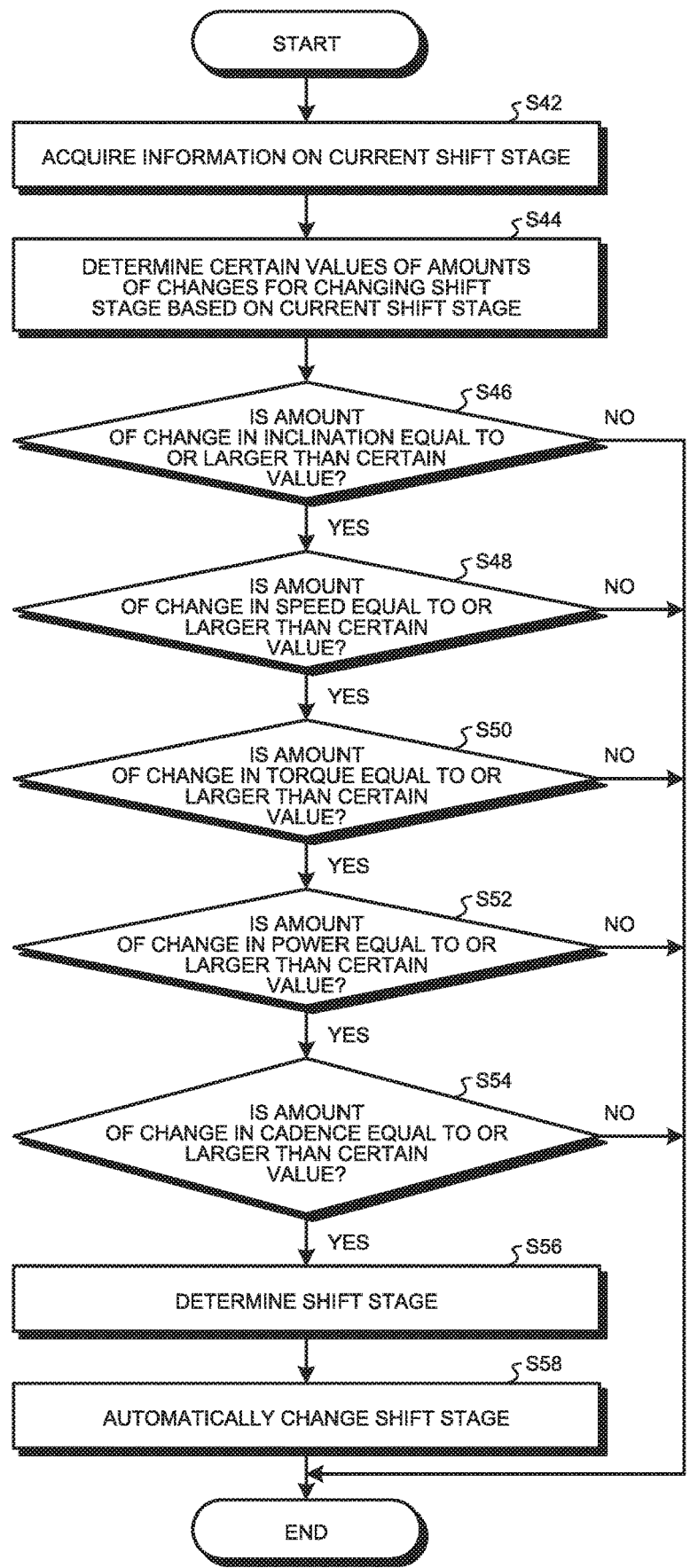
FIG. 8 is a flowchart illustrating an exemplary flow of other control by the shifting controller.

The following describes a flow of other control performed by the shifting controller with reference to a flowchart. FIG. 8 is a flowchart illustrating an exemplary flow of the control performed by the shifting controller. The shifting controller 40 performs the processing illustrated in FIG. 8 using the second shifting condition table 84 illustrated in FIG. 4 to control the shift stage. The shifting controller 40 performs the processing in the automatic shifting mode in which the shift stage is automatically changed. The embodiment is also applicable to the human-powered vehicle 10 that always automatically changes the shift stage without switching between the automatic shifting mode and the manual shifting mode.

The shifting controller 40 acquires information on the current shift stage (step S42). The control unit 62 acquires the information on the current shift stage based on the information acquired from the user input 36 via the data acquisition interface 60 and the information determined by the shift stage determination unit 76.

The shifting controller 40 determines certain values used for changing the shift stage based on the current shift stage (step S44). The shifting controller 40 sets the certain values based on the second shifting condition table 84 illustrated in FIG. 4 and the acquired information on the current shift stage. In the embodiment, the upper limit value of the amount of change in inclination, the upper limit value of the amount of change in speed, the upper limit value of the amount of change in torque, the upper limit value of the amount of change in power, and the upper limit value of the amount of change in cadence that are set for the current shift stage are set as the certain values.

After determining the respective certain values, the shifting controller 40 determines whether the amount of change in inclination is equal to or larger than the certain value (step S46). The control unit 62 detects the amount of change in inclination based on a temporal change in the detection result of the geomagnetic sensor 56. If it is determined that the amount of change in inclination is not equal to or larger than the certain value, i.e., the amount of change in inclination is smaller than the certain value (No at step S46), then the shifting controller 40 ends the processing.

If it is determined that the amount of change in inclination is equal to or larger than the certain value (Yes at step S46), then the shifting controller 40 determines whether the amount of change in speed is equal to or larger than the certain value (step S48). The control unit 62 detects the amount of change in speed, i.e., an acceleration, based on a temporal change in the detection result of the speed sensor 54. If it is determined that the amount of change in speed is not equal to or larger than the certain value, i.e., the amount of speed in speed is smaller than the certain value (No at step S48), then the shifting controller 40 ends the processing.

If it is determined that the amount of change in speed is equal to or larger than the certain value (Yes at step S48), then the shifting controller 40 determines whether the amount of change in torque is equal to or larger than the certain value (step S50). The control unit 62 detects the amount of change in torque based on a temporal change in the detection result of the torque sensor 52. If it is determined that the amount of change in torque is not equal to or larger than the certain value, i.e., the amount of change in torque is smaller than the certain value (No at step S50), then the shifting controller 40 ends the processing.

If it is determined that the amount of change in torque is equal to or larger than the certain value (Yes at step S50), then the shifting controller 40 determines whether the amount of change in power is equal to or larger than the certain value (step S52). The control unit 62 detects the amount of change in power based on temporal changes in the detection results of the torque, the inclination, and the cadence, for example. If it is determined that the amount of change in power is not equal to or larger than the certain value, i.e., the amount of change in power is smaller than the certain value (No at step S52), then the shifting controller 40 ends the processing.

If it is determined that the amount of change in power is equal to or larger than the certain value (Yes at step S52), then the shifting controller 40 determines whether the amount of change in cadence is equal to or larger than the certain value (step S54). The control unit 62 detects the amount of change in cadence based on a temporal change in the detection result of the cadence sensor 50. If it is determined that the amount of change in cadence is not equal to or larger than the certain value, i.e., the amount of change in cadence is smaller than the certain value (No at step S54), then the shifting controller 40 ends the processing.

If it is determined that the amount of change in cadence is equal to or larger than the certain value (Yes at step S54), then the shifting controller 40 determines the shift stage (step S56). That is, the shifting controller 40 determines the shift stage in a state where it is determined that the amounts of changes in all of the parameters are out of the respective certain values, specifically, in a state where it is determined that each parameter is larger than the corresponding upper limit value. The shift stage determination unit 76 of the shifting controller 40 performs processing so as to set a shift stage to which the current shift stage is to be changed. The shift stage determination unit 76 sets the shift stage based on the upper limit values and the lower limit values of the respective parameters in the first shifting condition table 82 and the parameters under the current traveling condition. Specifically, the shift stage determination unit 76 sets the shift stage for which each parameter under the current traveling condition is within a range between the upper limit value and the lower limit value of the parameter. The shifting controller 40 can determine the shift stage using the second shifting condition table 84 or another table. The shifting controller 40 can determine the shift stage number based on the predetermined number of change stages, such as a single stage, at step S56. The shift stage can be changed by two or more stages at a time.

The shifting controller 40 controls the shifting device 34 based on the determined shift stage, automatically changes the shift stage (step S58), and ends the processing.

As described above, the shifting controller 40 controls the shifting device of the human-powered vehicle and includes the data acquisition interface 60, the data storage device 64, and the control unit 62. The data acquisition interface 60 acquires first reference values of first variables in relation to the human-powered vehicle 10. The data storage device 64 stores therein a shifting condition specified by at least one of directions in changes, amounts of changes in the first variables, and rates of changes in the first variables that are information on changes in the first reference values. The control unit 62 controls the shifting device 34 based on the changes in the first variables and the shifting condition. The shifting controller 40 controls the shift stage based on the amounts of changes in various parameters, which are the first variables, thereby making it possible to set the shift stage adapted to the traveling condition.

The shifting controller 40 sets the certain values of the first variables using the second shifting condition table 84 as described above. The setting way is not limited thereto. The shifting controller 40 can perform determination from step S46 to step S54 in accordance with directions of change (an increasing trend, a decreasing trend, or a maintaining trend) preliminarily specified for each of a plurality of parameters. The shifting controller 40 can determine whether the processing to change the shift stage is to be performed based on the directions of changes in the first variables, instead of the certain values of the first variables such as the upper limit values and the lower limit values.

In the shifting controller 40, the first variables, which are the parameters used for determining the shift stage, include a plurality of different variables. The control unit 62 controls the shifting device 34 based on the multiple different ones of the first reference values and the shifting condition. The shifting controller 40 controls the shift stage based on the multiple first variables in this way, thereby making it possible to set the shift stage adapted to the traveling condition.

The shifting controller 40 preferably causes a notification device 38 to notify whether the shift stage is being automatically controlled or being controlled by the rider's operation. The notification device 38 as used herein is a combination of software and hardware, or just hardware that provides a notification to a user, and does not include a human. Examples of notification device 38 includes a light emitting element, a speaker 12B, a vibration element, and a display. As a result, the rider runs while knowing whether the human-powered vehicle 10 is traveling at the shift stage set by the rider or at the shift stage set by the shifting controller 40.

Flow of Other Control by Shifting Controller

Figure 9:
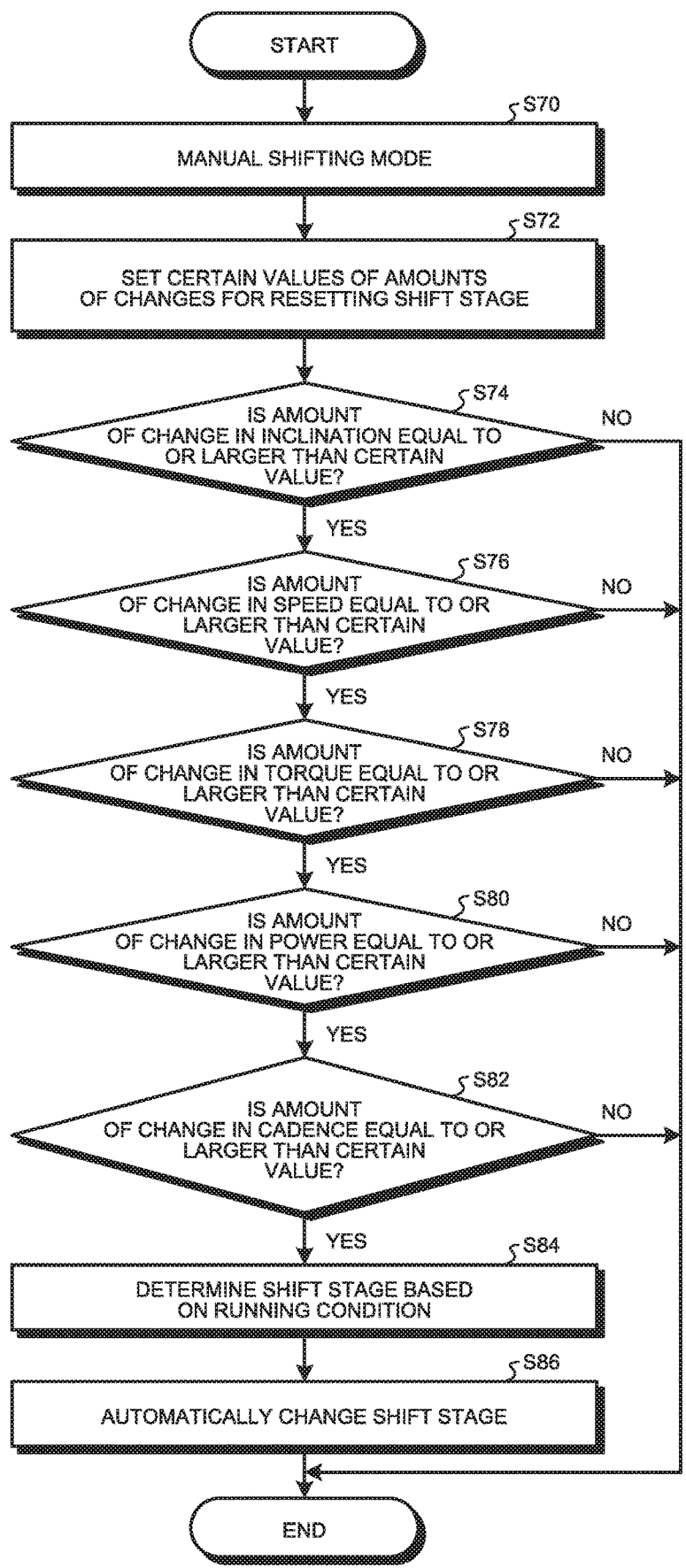
FIG. 9 is a flowchart illustrating an exemplary flow of other control by the shifting controller.

The following describes a flow of other control performed by the shifting controller with reference to a flowchart. FIG. 9 is a flowchart illustrating an exemplary flow of the control performed by the shifting controller. The shifting controller 40 performs the processing illustrated in FIG. 9 using the switching condition table 86 illustrated in FIG. 5 to determine whether the shift stage is to be changed, and controls the shift stage. The shifting controller 40 performs the processing in the manual shifting mode in which the shift stage is changed by the rider's operation. The shifting controller 40 can perform the processing in the automatic shifting mode in which the shift stage is automatically changed and determine whether the shift stage is to be changed. The embodiment is also applicable to the human-powered vehicle 10 that automatically switches between the automatic shifting mode and the manual shifting mode without switching between the automatic shifting mode and the manual shifting mode by the rider.

The shifting controller 40 detects that the manual shifting mode is set (step S70), and sets the respective certain values of the amounts of changes used for resetting the shift stage (step S72). Specifically, the shifting controller 40 sets the certain values based on the switching condition table 86 illustrated in FIG. 5. The certain values are thus constant values that are not changed in accordance with the current shift stage. In the embodiment, the upper limit value of the amount of change in inclination, the upper limit value of the amount of change in speed, the upper limit value of the amount of change in torque, the upper limit value of the amount of change in power, and the upper limit value of the amount of change in cadence that are set for the current shift stage are set as the certain values.

After determining the respective certain values, the shifting controller 40 determines whether the amount of change in inclination is equal to or larger than the certain value (step S74). The control unit 62 detects the amount of change in inclination based on a temporal change in the detection result of the geomagnetic sensor 56. If it is determined that the amount of change in inclination is not equal to or larger than the certain value, i.e., the amount of change in inclination is smaller than the certain value (No at step S74), the shifting controller 40 ends the processing. The shifting controller 40, thus, maintains the manual shifting mode. In this case, the notification device 38 notifies the rider that the shift stage is being controlled by the rider's operation. The rider, thus, knows that the human-powered vehicle 10 is traveling at the shift stage set by the rider.

If it is determined that the amount of change in inclination is equal to or larger than the certain value (Yes at step S74), then the shifting controller 40 determines whether the amount of change in speed is equal to or larger than the certain value (step S76). The control unit 62 detects the amount of change in speed, i.e., an acceleration, based on a temporal change in the detection result of the speed sensor 54. If it is determined that the amount of change in speed is not equal to or larger than the certain value, i.e., the amount of change in speed is smaller than the certain value (No at step S76), then the shifting controller 40 ends the processing. The shifting controller 40, thus, maintains the manual shifting mode. In this case, the notification device 38 notifies that the shift stage is being controlled by the rider's operation.

If it is determined that the amount of change in speed is equal to or larger than the certain value (Yes at step S76), then the shifting controller 40 determines whether the amount of change in torque is equal to or larger than the certain value (step S78). The control unit 62 detects the amount of change in torque based on a temporal change in the detection result of the torque sensor 52. If it is determined that the amount of change in torque is not equal to or larger than the certain value, i.e., the amount of change in torque is smaller than the certain value (No at step S78), then the shifting controller 40 ends the processing. The shifting controller 40, thus, maintains the manual shifting mode. In this case, the notification device 38 notifies that the shift stage is being controlled by the rider's operation.

If it is determined that the amount of change in torque is equal to or larger than the certain value (Yes at step S78), then the shifting controller 40 determines whether the amount of change in power is equal to or larger than the certain value (step S80). The control unit 62 detects the amount of change in power based on temporal changes in the detection results of the torque, the inclination, and the cadence, for example. If it is determined that the amount of change in power is not equal to or larger than the certain value, i.e., the amount of change in power is smaller than the certain value (No at step S80), then the shifting controller 40 ends the processing. The shifting controller 40, thus, maintains the manual shifting mode. In this case, the notification device 38 notifies that the shift stage is being controlled by the rider's operation.

If it is determined that the amount of change in power is equal to or larger than the certain value (Yes at step S80), then the shifting controller 40 determines whether the amount of change in cadence is equal to or larger than the certain value (step S82). The control unit 62 detects the amount of change in cadence based on a temporal change in the detection result of the cadence sensor 50. If it is determined that the amount of change in cadence is not equal to or larger than the certain value, i.e., the amount of change in cadence is smaller than the certain value (No at step S82), then the shifting controller 40 ends the processing. The shifting controller 40, thus, maintains the manual shifting mode. In this case, the notification device 38 notifies that the shift stage is being controlled by the rider's operation.

If it is determined that the amount of change in cadence is equal to or larger than the certain value (Yes at step S82), then the shifting controller 40 determines the shift stage based on the traveling condition (step S84). The shifting controller 40 performs the processing to reset the shift stage in a state where it is determined that the amounts of changes in all of the parameters are out of the respective certain values, specifically, in a state where it is determined that each parameter is larger than the corresponding upper limit value. The shift stage determination unit 76 of the shifting controller 40 performs processing so as to set a shift stage to which the current shift stage is to be changed. The shift stage determination unit 76 sets based on the upper limit values and the lower limit values of the respective parameters (variables) in the first shifting condition table 82 and the parameters (reference values) under the current traveling condition. Specifically, the shift stage determination unit 76 sets the shift stage for which each parameter (reference value) under the current traveling condition is within a range between the upper limit value and the lower limit value of the parameter. The shifting controller 40 can determine the shift stage using the second shifting condition table 84 or another table. In some cases, the shifting controller 40 determines, based on the traveling condition, that the current shift stage is to be maintained. The shifting controller 40 can determine the shift stage number based on the predetermined number of change stages, such as a single stage, at step S84. The shift stage can be changed by two or more stages at a time.

The shifting controller 40 controls the shifting device 34 based on the determined shift stage, automatically changes the shift stage (step S86), and ends the processing. The shifting controller 40 automatically controls the shifting device 34 based on the parameters (reference values) of the current traveling condition and the shifting condition table. In this case, the notification device 38 notifies the rider that the shift stage has been automatically controlled. As a result, the rider can know that the human-powered vehicle 10 is traveling at the shift stage set by the shifting controller 40.

The shifting controller 40 controls the shifting device 34 of the human-powered vehicle 10 and includes the data acquisition interface 60, the data storage device 64, and the control unit 62. The data acquisition interface 60 acquires the first reference values of the first variables in relation to the human-powered vehicle 10 and second reference values of second variables in relation to the human-powered vehicle 10. The data storage device 64 stores therein the shifting condition (the first shifting condition table or another condition table) specified by the first variables and the switching condition (the switching condition table 86) specified by the second variables. The control unit 62 maintains the current shift stage in a first state where the second reference values acquired by the data acquisition interface 60 do not satisfy the switching condition. The control unit 62 controls the shifting device 34 based on the first reference values and the shifting condition in a second state where the second reference values acquired by the data acquisition interface 60 satisfy the switching condition. It can also be said that the shifting system 11 includes the control unit 62 that controls the shifting device 34 based on only the shifting operation in the first state where the second reference values do not satisfy the switching condition acquired by the data acquisition interface 60. The control unit 62 controls the shifting device based on the first reference values and the shifting condition in the second state where the second reference values acquired by the data acquisition interface 60 satisfy the shifting condition. The shifting controller 40 can control the shifting device based on the shifting operation even in the second state. The shifting system 11 and the shifting controller 40 can perform both the automatic shifting and the manual shifting as described above, and further determine whether the shifting is to be automatically performed, and automatically control the shift stage in a state where the condition for shifting is satisfied, thereby making it possible to change the shift stage to one more suitable for the rider. In the embodiment, the second variables are the amounts of changes in parameters. The control can be performed based on the values of the parameters. In the embodiment, the variables in the switching condition table 86 can be set as certain values for the second variables and the variables each have both of the upper limit value and the lower limit value. The variables can each have only the upper limit value. The certain value can be a range of the variable. In the embodiment, the shifting controller 40 sets the certain values of the second variables for determination. The determination way is not limited thereto. The shifting controller 40 can perform determination from step S74 to step S82 in accordance with a direction of change (an increasing trend, a decreasing trend, or a maintaining trend) preliminarily specified for each of a plurality of parameters. As described above, the shifting controller 40 can determine whether the shift stage is to be reset based on the directions of changes in second variables, instead of the certain values of the second variables such as the upper limit values and the lower limit values.

In the shifting controller 40, the second variables, which specify the switching condition, include a plurality of different variables, and the control unit 62 maintains the current shift stage in a state where at least one of the multiple different ones of the second reference values does not satisfy the switching condition. As a result, the occurrence of an automatic change in the shift at timing the rider does not intend to change the shift can be prevented.

The switching condition is the information on the changes in the second variables. It is, thus, possible to determine whether the shift stage is to be changed in accordance with a change in traveling state. The switching condition is preferably specified such that the switching condition differs for each shift stage of the shifting device. As a result, the shift stage can be automatically changed at required timing according to a change in traveling state.

The first variables and the second variables can differ from each other. The first variables and the second variables can be identical as described in the embodiment. In the shifting controller 40, as illustrated in FIG. 7, the first variables include a plurality of different variables. The control unit 62 controls the shifting device based on the multiple different ones of the first reference values and the shifting condition, thereby making it possible to preferably control the shift stage.

The first variables preferably include at least one of traveling information on the traveling state of the human-powered vehicle and the environmental information on a traveling environment of the human-powered vehicle. The second variables preferably include at least one of the traveling information on the traveling state of the human-powered vehicle and the environmental information on the traveling environment of the human-powered vehicle. The traveling information includes at least one of the cadence, the torque acting on the crank of the human-powered vehicle, the vehicle speed, the acceleration, and the power, as described in the embodiment. The shifting controller 40 controls the shift stage based on the environmental information, thereby making it possible to adequately control the shifting.

While a certain embodiment and modifications of the present invention have been described, the description thereof is not intended to limit the embodiment. The constituting elements described herein include elements easily achieved by one skilled in the art, elements being substantially the same as the constituting elements, and elements within the scope of equivalents of the constituting elements. The constituting elements described herein can be combined in an appropriate manner. Furthermore, various omissions, substitutions and changes in the constituting elements may be made without departing from the spirit of the embodiment.

What is claimed is:

1. A shifting controller that controls a shifting device of a human-powered vehicle, the shifting controller comprising:
a data acquisition interface configured to acquire a first reference value of a first variable including at least one of traveling information and environmental information on a traveling environment in relation to the human-powered vehicle, the traveling information including at least one of a cadence, torque acting on a crank of the human-powered vehicle, and power;
a data storage device having stored therein a shifting condition specified by an amount of change of the first variable; and
a control unit including a processor configured to control the shifting device based on the amount of change of the first variable from the first reference value and the shifting condition.

2. The shifting controller according to claim 1, wherein the data acquisition interface is configured to acquire a plurality of the first reference values of a plurality of different ones of the first variables, and
the processor is configured to control the shifting device based on the first reference values and the shifting condition.

3. The shifting controller according to claim 1, wherein the traveling information further includes at least one of a speed of the human-powered vehicle and an acceleration.

4. The shifting controller according to claim 1, wherein the environmental information includes at least one of road surface information on a road surface state, and the road surface information includes an inclination, traveling resistance information on a traveling resistance, weather information on weather, and atmospheric temperature information on an atmospheric temperature.

5. A shifting system comprising the shifting controller according to claim 1 and further comprising:
a shifting device; and
a user input operatively connected to the shifting device.

6. A shifting controller that controls a shifting device of a human-powered vehicle, the shifting controller comprising:
a data acquisition interface configured to acquire a first reference value of a first variable that includes traveling information on a traveling state in relation to the human-powered vehicle and a second reference value of a second variable that includes environmental information on the traveling state in relation to the human-powered vehicle;
a data storage device having stored therein a shifting condition specified by an amount of change of the first variable, the data storage device further having stored therein a switching condition specified by the second variable; and
a control unit including a processor configured to
maintain a current shift stage in a first state where the second reference value acquired by the data acquisition interface does not satisfy the switching condition, and
control the shifting device based on the amount of change of the first variable from the first reference value and based on the shifting condition in a second state where the second reference value acquired by the data acquisition interface satisfies the switching condition.

7. The shifting controller according to claim 6, wherein the data acquisition interface is configured to acquire a plurality of the first reference values of a plurality of different ones of the first variables, and
the processor is configured to control the shifting device based on the first reference values and the shifting condition.

8. The shifting controller according to claim 6, wherein the data acquisition interface is configured to acquire a plurality of the second reference values of a plurality of different ones of the second variables, and
the processor is configured to maintain the current shift stage in a state where at least one of the second reference values does not satisfy the switching condition.

9. The shifting controller according to claim 6, wherein the switching condition is information on a change in the second variable.

10. The shifting controller according to claim 6, wherein the switching condition is specified to differ for each shift stage of the shifting device.

11. The shifting controller according to claim 6, wherein the first variable and the second variable differ from each other.

12. The shifting controller according to claim 6, wherein the first variable and the second variable are identical.

13. A shifting system comprising:
a shifting device of a human-powered vehicle;
a user input operatively connected to the shifting device;
a data acquisition interface configured to acquire a first reference value of a first variable that includes traveling information on a traveling state in relation to the human-powered vehicle and a second reference value of a second variable that includes environmental information on the traveling state in relation to the human-powered vehicle;

a data storage device having stored therein a shifting condition specified by an amount of change of the first variable, the data storage device further having stored therein a switching condition specified by the second variable; and a control unit including a processor configured to
control the shifting device based on only a shifting operation of the user input in a first state where the second reference value acquired by the data acquisition interface does not satisfy the switching condition, and
control the shifting device based on the amount of change of the first variable from the first reference value and based on the switching condition in a second state where the second reference value acquired by the data acquisition interface satisfies the switching condition.

14. The shifting system according to claim 13, wherein the processor is further configured to control the shifting device based on the shifting operation in the second state.

15. The shifting system according to claim 13, further comprising
a notification device configured to notify a user of a current state being in at least either the first state or the second state.

* * * * *